(No Model.)

J. B. GOSSMAN.
ASH SIFTER.

No. 588,980. Patented Aug. 31, 1897.

Witnesses;
C. W. Smith
Fred. J. Dole.

Inventor,
Joseph B. Gossman,
By his Attorney,
F. H. Richards.

THE NORRIS PETERS CO., PHOTO-LITHO., WASHINGTON, D. C.

UNITED STATES PATENT OFFICE.

JOSEPH B. GOSSMAN, OF HARTFORD, CONNECTICUT.

ASH-SIFTER.

SPECIFICATION forming part of Letters Patent No. 588,980, dated August 31, 1897.

Application filed February 26, 1897. Serial No. 625,073. (No model.)

*To all whom it may concern:*

Be it known that I, JOSEPH B. GOSSMAN, a citizen of the United States, residing at Hartford, in the county of Hartford and State of Connecticut, have invented certain new and useful Improvements in Ash-Sifters, of which the following is a specification.

This invention relates to improvements in ash-sifters; and it has for its main object the provision of an improved article of this class by means of which the ashes may be thoroughly agitated while turning with a rotary sieve, thus subjecting the ashes not only to the usual rotary action for separating the fine ashes from the lumps or larger particles of material, but also positively breaking up the mass while it is rotating.

Another object of my invention is to furnish an improved ash-sifter in which the sieve will be mounted upon a support removable from the casing and having a suitable bearing for supporting the rotary sieve, so that the latter may be removed from its support and the several parts of the sifter easily assembled and disassembled.

Figure 1:
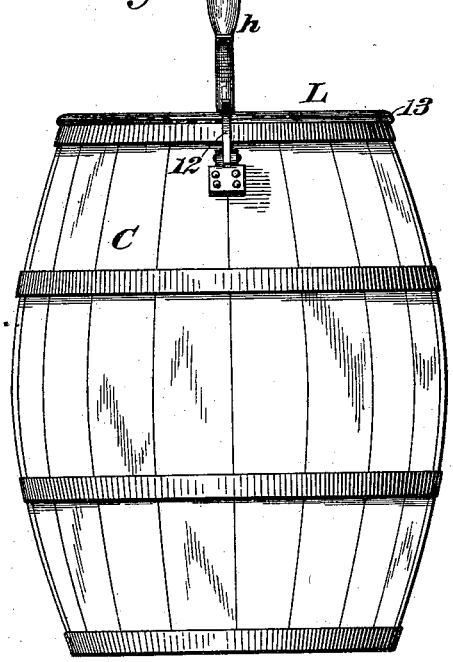
Figure 2:
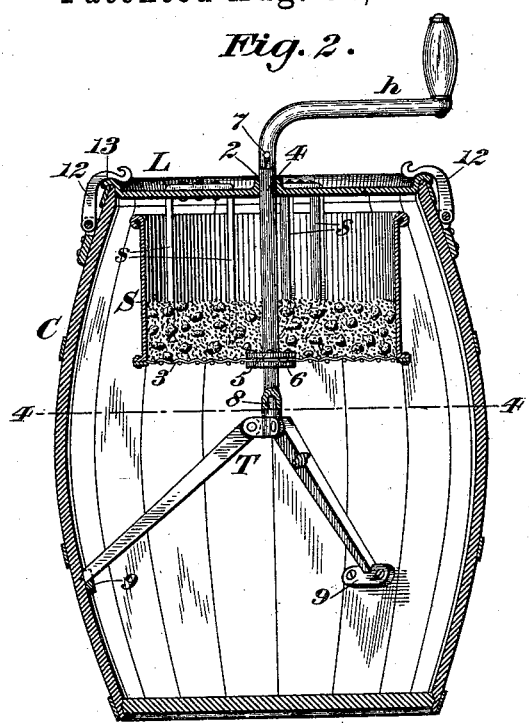
Figure 3:
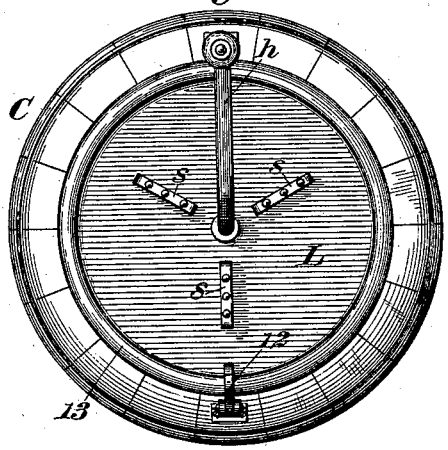
Figure 4:
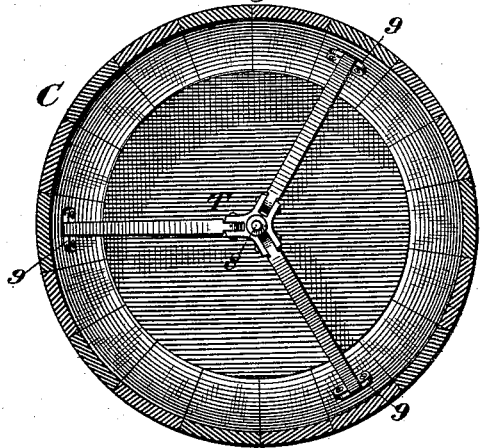

In the drawings accompanying and forming part of this specification, Figure 1 is a side elevation of an ash-sifter constructed in accordance with my present invention. Fig. 2 is a central longitudinal section of the same. Fig. 3 is a plan of the same; and Fig. 4 is a horizontal section of the ash-sifter, illustrating the support for the sieve, the section being taken in line 4 4, Fig. 2.

Similar characters designate like parts in all the figures of the drawings.

My improved ash-sifter comprises as its essential features some suitable supporting-casing, in which is mounted a rotary sieve supplied with a handle for turning the same, a cover for the casing, preferably having an opening through which is passed a central supporting-rod of the sieve, and stirrers projecting into the sieve and supported in such a manner as to dip into the ashes and thoroughly agitate and break up the same when the sieve is rotated within the casing.

The casing of my improved ash-sifter is designated in a general way by C, and it may be of any suitable construction, that illustrated in the drawings being preferred. This casing has a suitable cover or lid, (designated in a general way by L,) which may be of any desired construction, fitting the mouth of the casing of the sifter, and this lid preferably has a central opening at 2, through which the main supporting-rod of the sieve will generally be passed and which will form a lateral guide for positioning the sieve at its upper end.

The sieve proper, which constitutes the main member of the ash-sifter, is indicated in a general way by S and may be of any desired type, that illustrated in the present case having a circular periphery and having its bottom covered with heavy wire-netting, such as 3. In this instance the sieve is supported by a central rod 4, having a flanged portion 5, between which and a washer 6 the netting is engaged, this flange and the washer being connected in some suitable manner, as by means of rivets, in order to brace the parts firmly. At its upper end the rod 4 passes through the opening at 2 in the lid or cover of the casing, and has a handle, such as *h*, by means of which the sieve S may be rotated, this handle preferably being removably secured to the rod 4—as, for example, by means of the pin-and-slot connection shown at 7. The pin is formed as a projection from the rod 4 and the slot is cut longitudinally in the edge of the recessed end of the handle. At the lower end thereof the rod 4 is supported in a suitable frame, so as to permit rotation of the sieve and also guide the latter so as to prevent sidewise movement thereof. In this case the lower end of the rod 4 has a socket therein adapted to receive a step 8, carried by a tripod or other polypoidal support, which is designated in a general way by T. This support or tripod is jointed in the usual manner and may advantageously have the feet thereof pointed or sharpened, so as to engage the inner side of the casing C and obtain a firm hold thereon, this holding action being facilitated in this case by the provision of steps, such as 9, for receiving the feet of the tripod.

It will be obvious that in such a construction as this the support for the sieve may be readily inserted into the casing and removed therefrom regardless of the interior contour of the casing, as the jointing of the legs of the support permits these legs to be brought nearer together or spread farther apart, as may be desired.

The principal feature of my invention is the provision of means for stirring the ashes in the sieve while the latter is being rotated within the casing, and for this purpose I prefer to provide a plurality of stirrers so positioned as to dip nearly to the bottom of the ashes in the sieve. These stirrers are indicated herein as $s$ and are in the present case fixedly secured to the cover, so as to be removable therewith from the sifter. These stirrers may advantageously be in the form of strong iron or steel blades having their lower ends curved so as to engage the material in the sieve in an oblique direction, which will bring the least strain upon the stirrers, while at the same time enabling them to thoroughly loosen and break up the mass of material which is to be sieved.

As it will be obvious that the lifting force of the ashes which is exerted upon the stirrers will be considerable when the sieve is rotated, I find it necessary to maintain the lid or cover L firmly in position while the sifter is in use, and for this purpose I prefer to make use of some suitable holding means by which the cover may be removably secured to the casing. In this instance I have shown a pair of hooks 12, which are pivoted on the outside of the casing, in position to hook over the outer annular edge 13 of the lid L and clamp the same firmly down upon the barrel or casing C.

It will be apparent from the foregoing description that my improved ash-sifter constitutes a very simple and convenient article for thoroughly separating the finer particles of ashes from the larger pieces of coal and clinker contained therein and that the several members of the sifter may be readily taken apart for the purpose of substituting a new piece for one that is worn out or to permit the accumulated siftings in the barrel or receptacle to be removed therefrom.

Having described my invention, I claim—

1. In an ash-sifter, the combination, with a casing, of a rotary sieve therein having a central supporting-rod extending therethrough; a handle connected with the upper end of said rod for turning the sieve; a cover for the casing; and a jointed polypoidal support removably supported within the casing and having a bearing for the lower end of the supporting-rod of the sieve.

2. In an ash-sifter, the combination, with a casing, of a rotary sieve therein having a central supporting-rod extending therethrough; a handle connected with the upper end of said rod, for turning the sieve; a cover for the casing; stirrers fixed to said cover and projecting into the sieve and adapted to agitate the material therein on the turning of the sieve; holding means for removably clamping the cover to the casing, to hold the cover in place in opposition to the lifting force of the ashes during the rotation of the sieve; and a jointed polypoidal support removably supported within the casing and having a bearing for the lower end of the supporting-rod of the sieve.

JOSEPH B. GOSSMAN.

Witnesses:
FRED. J. DOLE,
HEATH SUTHERLAND.